United States Patent
Kliner et al.

(10) Patent No.: US 9,837,783 B2
(45) Date of Patent: Dec. 5, 2017

(54) HIGH-POWER, SINGLE-MODE FIBER SOURCES

(71) Applicant: nLIGHT Photonics Corporation, Vancouver, WA (US)

(72) Inventors: Dahv A. V. Kliner, Vancouver, WA (US); Roger L. Farrow, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/004,680

(22) Filed: Jan. 22, 2016

(65) Prior Publication Data

US 2016/0218476 A1    Jul. 28, 2016

Related U.S. Application Data

(60) Provisional application No. 62/108,015, filed on Jan. 26, 2015.

(51) Int. Cl.
*H01S 3/06* (2006.01)
*H01S 3/067* (2006.01)
(Continued)

(52) U.S. Cl.
CPC ........ *H01S 3/06729* (2013.01); *H01S 3/0675* (2013.01); *H01S 3/08045* (2013.01);
(Continued)

(58) Field of Classification Search
None
See application file for complete search history.

(56) References Cited

U.S. PATENT DOCUMENTS

| 4,998,797 A | 3/1991 | van den Bergh et al. |
| 5,818,630 A | 10/1998 | Fermann et al. |

(Continued)

FOREIGN PATENT DOCUMENTS

| WO | WO 2004/027477 | 4/2004 |
| WO | WO 2013/090236 | 6/2013 |

OTHER PUBLICATIONS

Ghatak et al., "Design of Waveguide Refractive Index Profile to Obtain Flat Model Field", *SPIE*, 3666:40-44 (Apr. 1999).

(Continued)

*Primary Examiner* — Armando Rodriguez
(74) *Attorney, Agent, or Firm* — Klarquist Sparkman, LLP

(57) ABSTRACT

An optical apparatus includes one or more pump sources situated to provide laser pump light, and a gain fiber optically coupled to the one or more pump sources, the gain fiber including an actively doped core situated to produce an output beam, an inner cladding and outer cladding surrounding the doped core and situated to propagate pump light, and a polymer cladding surrounding the outer cladding and situated to guide a selected portion of the pump light coupled into the inner and outer claddings of the gain fiber. Methods of pumping a fiber sources include generating pump light from one or more pump sources, coupling the pump light into a glass inner cladding and a glass outer cladding of a gain fiber of the fiber source such that a portion of the pump light is guided by a polymer cladding surrounding the glass outer cladding, and generating a single-mode output beam from the gain fiber.

20 Claims, 3 Drawing Sheets

(51) Int. Cl.
*H01S 3/08* (2006.01)
*H01S 3/094* (2006.01)

(52) U.S. Cl.
CPC .... *H01S 3/094007* (2013.01); *H01S 3/06733* (2013.01); *H01S 3/09408* (2013.01)

(56) References Cited

U.S. PATENT DOCUMENTS

| | | | |
|---|---|---|---|
| 5,903,696 | A | 5/1999 | Krivoshlykov |
| 5,999,548 | A | 12/1999 | Mori et al. |
| 6,132,104 | A | 10/2000 | Bliss et al. |
| 6,330,382 | B1 | 12/2001 | Harshbarger et al. |
| 6,434,177 | B1 | 8/2002 | Jurgensen |
| 6,556,340 | B1 | 4/2003 | Wysocki et al. |
| 6,801,550 | B1 | 10/2004 | Snell et al. |
| 6,839,163 | B1 | 1/2005 | Jakobson et al. |
| 6,941,053 | B2 | 9/2005 | Lauzon et al. |
| 7,068,900 | B2 | 6/2006 | Croteau et al. |
| 7,079,566 | B2 | 7/2006 | Kido et al. |
| 7,170,913 | B2 | 1/2007 | Araujo et al. |
| 7,235,150 | B2 | 6/2007 | Bischel et al. |
| 7,592,568 | B2 | 9/2009 | Varnham et al. |
| 7,593,435 | B2 | 9/2009 | Gapontsev et al. |
| 8,270,441 | B2 | 9/2012 | Rogers et al. |
| 8,270,445 | B2 | 9/2012 | Morasse et al. |
| 8,542,145 | B2 | 9/2013 | Galati |
| 9,014,220 | B2 | 4/2015 | Minelly et al. |
| 9,136,663 | B2 | 9/2015 | Taya |
| 9,217,825 | B2 | 12/2015 | Ye et al. |
| 2009/0080835 | A1 | 3/2009 | Frith |
| 2010/0067860 | A1* | 3/2010 | Ikeda .............. G02B 6/03633 385/127 |
| 2010/0150186 | A1 | 6/2010 | Mizuuchi |
| 2011/0091155 | A1 | 4/2011 | Yilmaz et al. |
| 2011/0305256 | A1 | 12/2011 | Chann |
| 2012/0051692 | A1 | 3/2012 | Seo |
| 2012/0262781 | A1 | 10/2012 | Price et al. |
| 2014/0086526 | A1 | 3/2014 | Starodubov et al. |
| 2014/0233900 | A1 | 8/2014 | Hugonnot et al. |
| 2015/0049987 | A1 | 2/2015 | Grasso et al. |
| 2015/0104139 | A1 | 4/2015 | Brunet et al. |
| 2015/0138630 | A1 | 5/2015 | Honea et al. |
| 2015/0349481 | A1 | 12/2015 | Kliner |

OTHER PUBLICATIONS

Notice of Allowance for related U.S. Appl. No. 14/293,941, 5 pages, mailed May 6, 2016.
Office Action for related U.S. Appl. No. 14/293,941, 6 pages, mailed May 11, 2015.
Office Action for related U.S. Appl. No. 14/293,941, 9 pages, mailed Dec. 1, 2015.
"Triple Clad Ytterbium-Doped Polarization Maintaining Fibers," nuFERN Driven to Light Specifications, 1 page (Jan. 2006).
Varshney et al., "Design of a flat field fiber with very small dispersion slope", *Optical Fiber Technology*, 9(3):189-198 (2003).
International Search Report and Written Opinion for related International Application No. PCT/US2016/041526, 6 pages, mailed Oct. 20, 2016.
International Search Report and Written Opinion for related International Application No. PCT/US2016/053807, 6 pages, mailed Jan. 19, 2017.
Office Action for related U.S. Appl. No. 15/074,838, 12 pages, dated May 19, 2017.

* cited by examiner

HIGH-POWER, SINGLE-MODE FIBER SOURCES

CROSS REFERENCE TO RELATED APPLICATION

This application claims the benefit of U.S. Provisional Patent Application No. 62/108,015, filed Jan. 26, 2015, which is incorporated by reference herein in its entirety.

FIELD

The disclosure pertains to high-power single-mode fiber lasers and amplifiers.

BACKGROUND

Power scaling of high average power fiber sources tends to be limited by pump powers launched into a gain fiber of the fiber source and by the onset of nonlinear optical processes in the fiber. Addressing these limitations often requires balancing conflicting design goals resulting in compromises that negatively impact system performance with regard to total output power, beam quality, wall-plug efficiency, reliability, cost, complexity, and/or manufacturability. The power scaling problems tend to be particularly acute for sources capable of producing single-mode output beams, which are highly desirable for a variety of applications, as output beam powers approach about 1 kW and greater.

SUMMARY

According to one aspect, an optical apparatus includes one or more pump sources situated to provide laser pump light, and a gain fiber optically coupled to the one or more pump sources, the gain fiber including an actively doped core situated to produce an output beam, an inner cladding and outer cladding surrounding the doped core and situated to propagate pump light, and a polymer cladding surrounding the outer cladding and situated to guide a selected portion of the pump light coupled into the inner and outer claddings of the gain fiber.

According to another aspect, a method of pumping a high power fiber source includes generating pump light at a pump wavelength from one or more pump sources, coupling the pump light into a glass inner cladding and a glass outer cladding of a gain fiber of the fiber source such that a portion of the pump light is guided by a polymer cladding surrounding the glass outer cladding, and generating a single-mode output beam from the gain fiber.

The foregoing and other objects, features, and advantages of the disclosed technology will become more apparent from the following detailed description, which proceeds with reference to the accompanying figures.

DETAILED DESCRIPTION

Figure 1A:
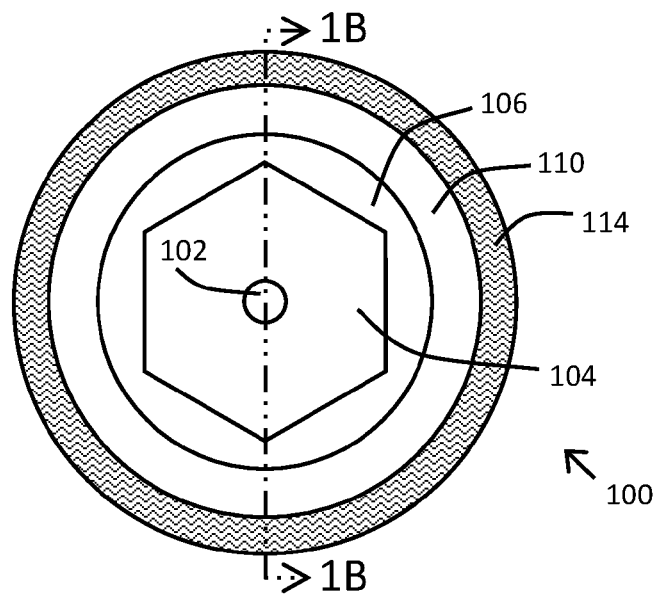
FIG. 1A is a cross-sectional view of a representative gain fiber.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

As used herein, optical radiation refers to electromagnetic radiation at wavelengths of between about 100 nm and 10 µm, and typically between about 500 nm and 2 µm. Examples based on available laser diode sources and optical fibers generally are associated with wavelengths of between about 800 nm and 1700 nm. In some examples, propagating optical radiation is referred to as one or more beams having diameters, beam cross-sectional areas, and beam divergences that can depend on beam wavelength and the optical systems used for beam shaping. For convenience, optical radiation is referred to as light in some examples, and need not be at visible wavelengths.

Representative embodiments are described with reference to optical fibers, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

As used herein, numerical aperture (NA) refers to a largest angle of incidence with respect to a propagation axis defined by an optical waveguide for which propagating optical radiation is substantially confined. In optical fibers, fiber cores and fiber claddings can have associated NAs, typically defined by refractive index differences between a core and cladding layer, or adjacent cladding layers, respectively. While optical radiation propagating at such NAs is generally well confined, associated electromagnetic fields such as evanescent fields typically extend into an adjacent cladding layer. In some examples, a core NA is associated with a core/inner cladding refractive index difference, and a cladding NA is associated with an inner cladding/outer cladding refractive index difference. For an optical fiber having a core refractive index $n_{core}$ and a cladding index $n_{clad}$, a fiber core NA is $NA=\sqrt{n_{core}^2-n_{clad}^2}$. For an optical fiber with an inner core and an outer core adjacent the inner core, a cladding NA is $NA=\sqrt{n_{inner}^2-n_{outer}^2}$, wherein $n_{inner}$ and $n_{outer}$ are refractive indices of the inner cladding and the outer cladding, respectively. Optical beams as discussed above can also be referred to as having a beam NA which is associated with a beam angular radius. While multi-core step index fibers are described below, gradient index designs can also be used.

In the examples disclosed herein, a waveguide core such as an optical fiber core is doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam.

The term brightness is used herein to refer to optical beam power per unit area per solid angle. In some examples, optical beam power is provided with one or more laser diodes that produce beams whose solid angles are proportional to beam wavelength and beam area. Selection of beam area and beam solid angle can produce pump beams that couple selected pump beam powers into one or more core or cladding layers of double, triple, or other multi-clad optical fibers.

Figure 1B:
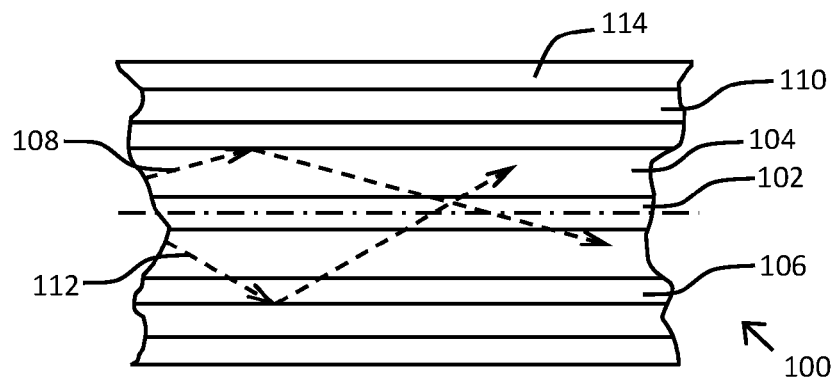
FIG. 1B is side cross-sectional view of the representative gain fiber of FIG. 1A.
Figure 1C:
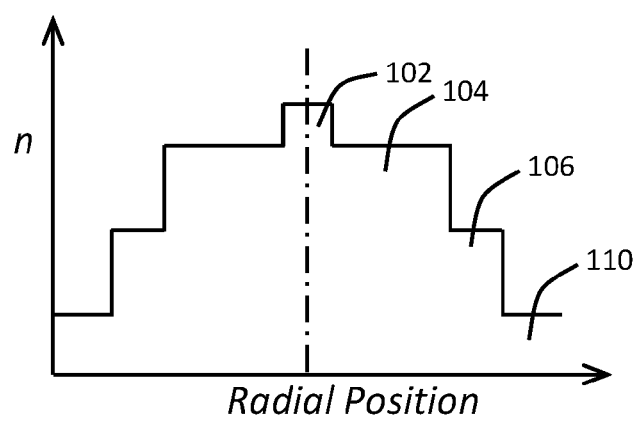
FIG. 1C is a refractive index profile of the fiber cross-section of FIGS. 1A-1B.

FIGS. 1A-1B and 1C are cross-sectional diagrams of a representative triple-clad optical gain fiber 100 and an associated refractive index profile, respectively. The optical gain fiber 100 includes a core 102 doped with active ions, such as ytterbium, erbium, other rare earth elements, or other elements suitable for optical gain. A glass inner cladding 104 surrounds the core 102 and has a refractive index suitably lower than the core 102 so as to guide laser light generated in the core 102 to propagate along a core axis through total internal reflection. A glass outer cladding 106 surrounds the glass inner cladding 104 and has a refractive index suitably lower than the inner cladding 104 so as confine laser pump light, shown with representative ray 108, of particular NAs to propagate in glass inner cladding 104 including through core 102. A low index polymer cladding 110 surrounds the glass outer cladding 106 and has a refractive index suitably lower than the outer cladding 106 so as to also guide laser pump light of larger NAs than the pump light guided within the glass cladding 104. Such pump light, shown with representative ray 112, is thus guided to propagate in the outer and inner glass claddings 104, 106, including through the core 102. Guided pump light traversing the core 102, produces excited states in the active dopants so as to provide optical gain. Such gain can result in an output beam which generally propagates in the core 102. A sleeving 114 or other material can be situated to surround the polymer cladding 110 in order to protect the fiber 100 from damage.

Various parameters of the gain fiber 100 are selected such that pump light coupled into the gain fiber 100 is partitioned between a glass-guided region associated with the inner cladding 104 and a polymer-guided region associated with the outer cladding 106. In this way, representative output beam powers associated with the gain fiber 100 can be scaled to 1 kW or more while maintaining system reliability, manufacturability, and single-mode operation, without difficult manufacturing tolerances, precise control or adjustment of the gain fiber bend radius, or other onerous packaging constraints. Gain fibers such as the gain fiber 100 enable power scaling of single-mode fiber sources to 1 kW or more using simple pump sources. Accordingly, such higher power single-mode fiber sources can be made available with a level of reliability, manufacturability, stability, and practicality typically associated with lower-power single-mode and multi-mode fiber sources. While generally circular and hexagonal cladding cross-sections are depicted in FIGS. 1A-1B, it will be appreciated that other cross-sections can be used for the different claddings, including square, octagonal, elliptical, oval, etc., including different shapes for different claddings. It will also be appreciated that while uniformly flat and sharp step refractive index profiles are depicted, other refractive index variations can be provided, including variations at cladding boundaries or within claddings. Also, other elements or regions can be disposed in the fiber 100, such as stress rods or other polarization-maintaining elements, and one or more additional dopants. Cladding cross-sections can also be non-symmetric. For example, inner cladding 104 or outer cladding 106 (or both) can be offset from the center of the core 102.

In representative examples, core 102 is doped with ytterbium for laser output at about 1080 nm and has a diameter of about 13 μm for robust single-mode beam quality. Corresponding beam parameter products of associated beams are generally less than 0.4 mm-mrad, corresponding to an $M^2$ of about 1.2 or better. A single-mode output beam power of about 1.5 kW can be obtained using around 2 kW of pump power. Up to 800 W of pump power can be selected to become guided to propagate in the outer cladding 106 by the low index polymer cladding 110, though this amount can be larger or smaller depending on the selection of other fiber properties, such as fiber length, core size, cladding diameters, as well as other factors, such as factory cleanliness, manufacturing process maturity and control, tooling and equipment quality, operator skill level, etc. In some examples, 5%, 20%, 40%, or more of pump light is guided by the low index polymer cladding 110. In some examples, a polymer cladding is omitted and an outer cladding/air interface defines the outer cladding NA.

While the core 102 of gain fiber 100 can generally be selected to be single-mode, in some examples or multimode or few-mode cores can be used. In such cores, the core diameter and associated NA can be chosen such that single-mode operation is provided by way of preferential gain for the fundamental mode or loss of higher order modes (or both) with typical fiber tolerances and packaging and corresponding coiling dimensions. That is, careful control of fiber specifications or careful limitations on packaging for optimization of bend radius are of less concern in achieving single-mode performance, leading to fewer design constraints or compromises.

The diameters of the inner cladding 104 and outer cladding 106 and the amount of pump light partitioned between the inner cladding 104 and the outer cladding 106 can depend on the brightness of the pump light coupled to the gain fiber 100. For example, for a given cladding diameter, brighter pumps will have a larger fraction of the total pump power coupled into the lower NA glass inner cladding 104. In representative examples of gain fiber 100, the core 102 is actively doped silica with an NA less than about 0.08, glass inner cladding 104 is silica with an NA of about 0.23, and the glass outer cladding 106 is fluorosilicate glass which captures light with an NA of about 0.46 due to the presence of the low index polymer 110 which can be fluoroacrylate. Selection of the various cladding diameters can be a multi-dimensional optimization and depend on system details, including the desired output power of the system, available pump brightness, core design, manufacturing capability, etc. In representative examples, inner cladding diameters can be in the range of 200-250 μm and outer cladding diameters can be selected in the range of 220-300 μm.

However, by utilizing the selective partitioning of pump power described herein, a sufficiently small glass outer cladding diameter can be provided, which leads to sufficient pump absorption in the already small core so that a suitable short fiber length can be used in the generation of output powers which can exceed 1 kW before the onset of detrimental nonlinear processes. That is, the fiber length parameter is often determined by absorption of pump light in the core which is most typically determined by the ratio of core and cladding cross-sectional areas. Increased pump absorption can be obtained by increasing core diameter at the expense of losing single-mode output, or by increasing fiber length but at the expense of generating nonlinear processes. For pumping Yb gain fiber, one conventional approach is to use pump light with a lower quantum defect, i.e., a wavelength closer to the output wavelength, such as 980 nm. However, since only a fraction of the pump power is guided by the polymer cladding 110 in accordance with aspects of embodiments herein, high brightness, high-reliability 915 nm pump sources can be used to generate 1 kW or more in a single-mode output beam without resorting to less reliable or more expensive pump technology. Nonlinear processes typically include stimulated Raman scattering (SRS), stimulated Brillouin scattering (SBS), self-phase modulation (SPM), and four-wave mixing (FWM). In some examples, the length of the gain fiber can be selected to be sufficiently short due to the partitioning of pump power that out-of-band power associated with the generation of optical nonlinearities is 20% or less than the power of the output beam. In additional examples it is 5% or less, 1% or less, or substantially zero.

In accordance with examples herein, for a given core design, the resultant pump absorption per unit length is significantly higher, and a corresponding gain fiber length can be significantly shorter, than it would be if substantially all of the pump light was guided by the glass outer cladding 106. As a result, the diameter of the core 102 can be selected so that single-mode operation of the high power output beam is maintained. Thus, the power-handling benefits of glass clad fibers can be obtained without the customary single-mode power scaling limit associated therewith. Given the brightnesses available with modern pump sources, fiber source output powers of greater than 1 kW are achievable while maintaining a sufficiently small core diameter for robust single-mode operation even when pumping at practical wavelengths such as 900-940 nm, 910-930 nm, or 915 nm. In representative gain fibers, fiber oscillator lengths can be in the range of 10-30 m. When used with a pump combiner, typical pump sources produce pump beams having NAs suitable for coupling power in the fiber cores as well as inner claddings and outer claddings.

Figure 2:
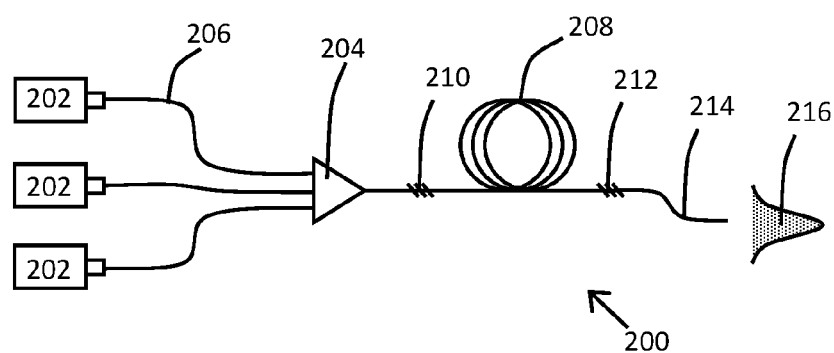
FIG. 2-5 show schematics of representative embodiments of fiber sources.

Referring to FIG. 2, a representative fiber laser system 200 includes a plurality of pump sources 202 coupled to a pump combiner 204 with pump delivery fibers 206. Pump sources 202 can each provide the same pump output power and brightness or they can be different. The pump combiner 204 is operable to combine the incident pump light from the pump sources 202 in a combined pump output with a selected NA profile. The combined pump output is optically coupled to a single-mode gain fiber 208. The gain fiber 208 is disposed between fiber Bragg gratings 210, 212 each having reflectivities selected to provide laser operation at the laser wavelength associated with the active elements in the gain fiber core. For example, the grating 210 can have a high reflectivity at the laser wavelength, such as 90%, 95%, 99%, or higher. The grating 212 is operable as the output coupler for the gain fiber 208 and can have a reflectivity associated with a desired laser output power. A delivery fiber 214 is coupled to the gain fiber 208 and can be used to deliver a high power single-mode output beam 216 to a target. The parameters of the gain fiber 208 are selected such that the pump power coupled into the gain fiber 208 is partitioned between being guided by an outer cladding and being guided by a low index cladding, such as a polymer cladding, surrounding the outer cladding.

Figure 3:
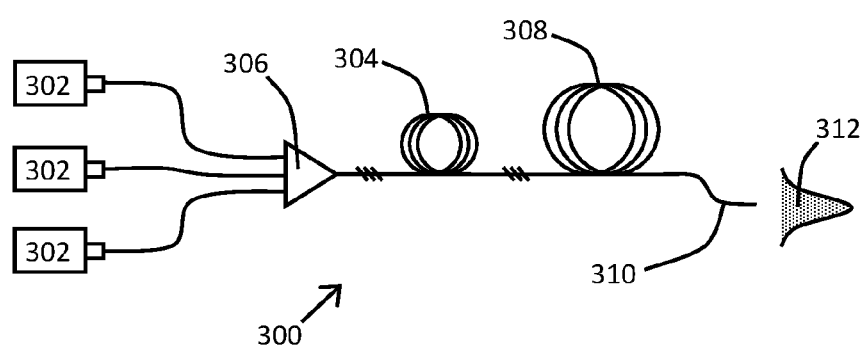

As shown in FIG. 3, a fiber laser system 300 includes a plurality of pump sources 302 of selected NA coupled to a fiber oscillator gain fiber 304 with a pump combiner 306. The output of the gain fiber 304 can then be amplified with a subsequent fiber amplifier gain fiber 308 so that the fiber laser system 300 operates in a master-oscillator power amplifier configuration. A delivery fiber 310 is coupled to the fiber amplifier gain fiber 308 so as to receive an amplified single-mode output beam 312 for subsequent delivery to a target or for subsequent application in larger laser systems, such as becoming combined in a single-mode fiber combiner. The fiber oscillator gain fiber 304 and fiber amplifier gain fiber 308 include glass inner and outer claddings surrounding respective doped cores so that pump light is partitioned to achieve high power single-mode output.

Figure 4:
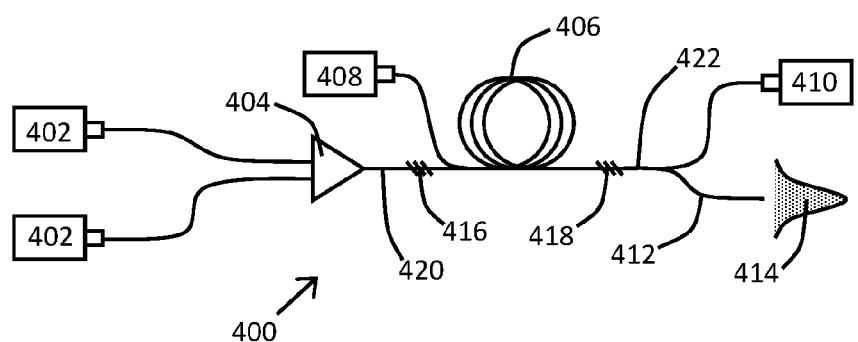

Referring to FIG. 4, a fiber laser system 400 includes a plurality of pump sources 402 coupled to a pump combiner 404 so as to couple pump light therefrom into an input end 420 of a fiber oscillator gain fiber 406. One or more additional pump sources 408 are coupled into the gain fiber

406, e.g., by splice or pump combiner, between fiber Bragg gratings 416, 418. One or more additional pump sources 410 are coupled into the gain fiber 406 through an output end 422 of the gain fiber 406. A delivery fiber 412 provides a high power single-mode output beam 414 for subsequent laser beam application. The parameters of the gain fiber 406 are selected and the pump power NA is selected such that for the pump power coupled into the gain fiber 208 a portion of the pump power is guided by an outer cladding and another portion is guided by a lower index cladding surrounding the outer cladding.

Figure 5:
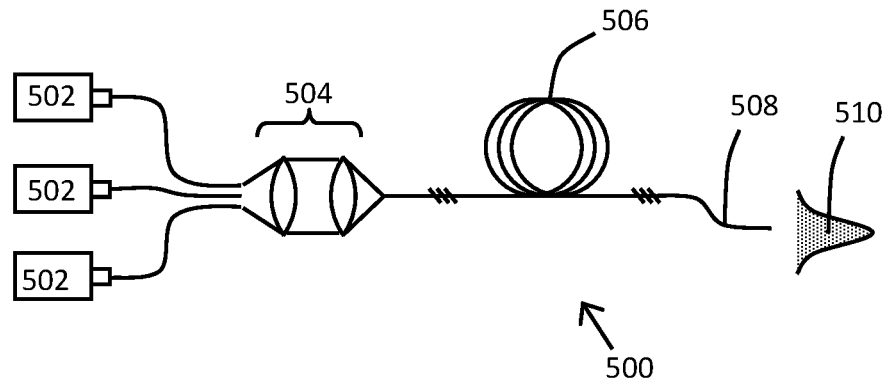

With reference to FIG. 5, a fiber laser system 500 includes a plurality of pump sources 502 which are free-space coupled with optics 504 into a gain fiber 506. A delivery fiber 508 is coupled to the gain fiber 506 and is situated to delivery a high power single-mode output beam 510 for subsequent application. The parameters of the gain fiber 506 and pump light NA coupled therein are selected such that a portion of the pump power is guided by an outer cladding and another portion is guided by a lower index cladding surrounding the outer cladding.

Figure 6:
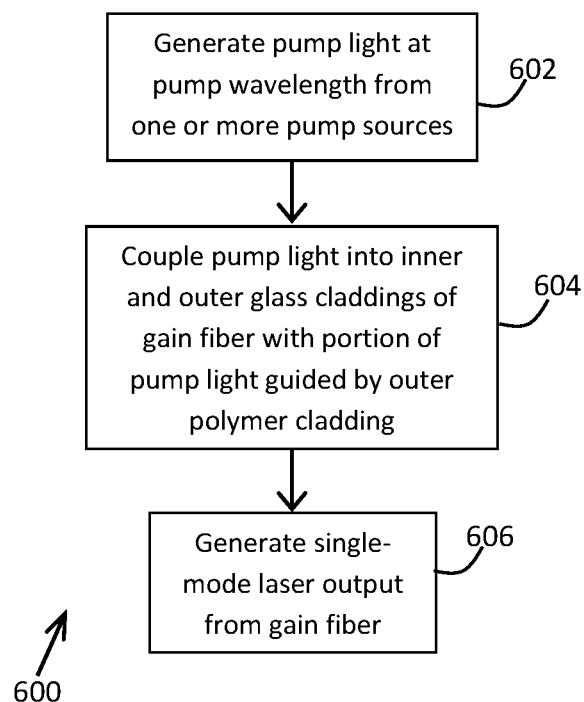
FIG. 6 is a flowchart of a representative method of pumping a gain fiber.

FIG. 6 is a flowchart showing an example of a representative method 600 of providing high power laser beams. At 602, pump light is generated at a pump wavelength from one or more pump sources. Pump wavelengths of relatively large quantum defect can be selected, such as pump wavelengths shorter than about 930 nm for gain above 1050 nm. At 604, pump light is coupled into a glass inner cladding and glass outer cladding of a gain fiber so that a significant portion of the pump power propagates in an outer cladding situated about an inner cladding surrounding a doped core. Typically, a low index polymer cladding surrounding the outer glass cladding at least partially defines an outer cladding NA. At 606, a high power single-mode laser output beam is generated from the gain fiber. Single-mode output beams produced in this way can have powers of 1 kW or more and without the disadvantages of conventional approaches.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

We claim:

1. An optical apparatus, comprising:
   one or more pump sources situated to produce a pump light; and
   a gain fiber including an actively doped core situated to produce an output beam, an inner cladding surrounding the actively doped core, an outer cladding surrounding the inner cladding, and a polymer cladding surrounding the outer cladding;
   wherein the gain fiber is optically coupled to the one or more pump sources with a selected partitioning of a first selected portion of the pump light that is guided to propagate in the gain fiber by a boundary between the polymer cladding and outer cladding and a second selected portion of the pump light that is guided to propagate in the gain fiber by a boundary between the outer cladding and the inner cladding;
   wherein the partitioning of the pump light is selected and the gain fiber has a length associated with the selected partition such that the output beam is a single mode beam having an output beam power that is greater than or equal to 1 kW, with out-of-band nonlinear optical power that is 20% or less than the output beam power.

2. The apparatus of claim 1, wherein the pump light coupled into the gain fiber has an NA larger than the NA of the inner cladding.

3. The apparatus of claim 1, wherein the pump light has a wavelength between 910 and 920 nm.

4. The apparatus of claim 1, wherein the actively doped core is a few-mode core.

5. The apparatus of claim 1, wherein the one or more pump sources are situated to couple at least 50 W or more of pump light into the gain fiber so as to be guided by the polymer cladding.

6. The apparatus of claim 1, further comprising a pump combiner situated to receive the pump light from the one or more pump sources and to combine the pump light into a pump combiner fiber output that is optically coupled to the gain fiber.

7. The apparatus of claim 1, wherein the one or more pump sources are situated to couple 800 W or less of pump light into the gain fiber so as to be guided by the polymer cladding.

8. The apparatus of claim 1, wherein the NA of the inner cladding is between 0.20 and 0.26.

9. The apparatus of claim 1, wherein the NA of the outer cladding is between 0.40 and 0.52.

10. The apparatus of claim 1, wherein the output beam has a wavelength between 1000 nm and 1200 nm and the pump light has a wavelength shorter than 930 nm.

11. The apparatus of claim 1, wherein the out-of-band optical nonlinearities are 5% or less of the power of the output beam.

12. The apparatus of claim 1, wherein 40% or less of the pump light coupled into the gain fiber is guided by the boundary between the polymer cladding and the outer cladding.

13. The apparatus of claim 1, wherein the gain fiber is a fiber oscillator.

14. The apparatus of claim 1, wherein the gain fiber is a master oscillator fiber amplifier.

15. The apparatus of claim 1, wherein the output beam power is an average power of at least 1.5 kW.

16. A method of pumping a high power fiber source, comprising:
    generating pump light at a pump wavelength from one or more pump sources;
    coupling the pump light into a gain fiber of the high power fiber source having an active core, an inner cladding surrounding the active core, an outer cladding surrounding the inner cladding, and a polymer cladding surrounding the outer cladding, so as to selectively partition the pump light such that a first selected portion of the pump light is guided by a boundary between the polymer cladding surrounding the outer cladding and a second selected portion of the pump light is guided by a boundary between the outer cladding and the inner cladding; and
    generating a single-mode output beam from the gain fiber;
    wherein partitioning of the pump light and the length of the gain fiber are selected so as to provide the output beam with a power of 1 kW or greater and single-mode and so as to limit out of band optical nonlinearities to 20% or less of the power of the output beam.

17. The method of claim 16, wherein the first selected portion is at least 10% of the coupled pump light.

18. The method of claim 16, wherein the pump light has a wavelength between 910 nm and 920 nm.

19. The method of claim 16, wherein the out of band optical nonlinearities are 5% or less of the power of the output beam.

20. The method of claim 16, wherein the polymer cladding is situated to guide at least 50 W of the pump light.

\* \* \* \* \*